(12) United States Patent
Post

(10) Patent No.: US 6,906,528 B2
(45) Date of Patent: Jun. 14, 2005

(54) ELECTRONIC NON-CONTACTING LINEAR POSITION MEASURING SYSTEM

(75) Inventor: Richard F. Post, Walnut Creek, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 10/676,906

(22) Filed: Sep. 30, 2003

(65) Prior Publication Data

US 2005/0068042 A1 Mar. 31, 2005

(51) Int. Cl.[7] .......................... G01R 27/04; G01V 3/08; G08B 5/22
(52) U.S. Cl. .................. 324/644; 324/326; 340/825.49
(58) Field of Search .................. 340/982, 987, 340/988, 489, 524, 686.1, 426.19, 825.49, 825.36, 815.58, 933–936, 938, 939, 941, 573.1, 573.3–573.4, 995.28, 991–994; 246/2 R, 20, 122 R; 324/644, 642, 637, 629, 600, 226, 326–329, 207.16–207.17, 207.26; 318/652; 342/22, 357.01, 357.08–357.09, 357.06, 357.17, 386, 450, 457, 459

(56) References Cited

U.S. PATENT DOCUMENTS

| | | | | |
|---|---|---|---|---|
| 3,731,184 A | * | 5/1973 | Goldberg et al. | 324/239 |
| 5,708,427 A | * | 1/1998 | Bush | 340/941 |
| 6,097,189 A | * | 8/2000 | Arndt et al. | 324/326 |
| 6,452,504 B1 | * | 9/2002 | Seal | 340/825.49 |
| 6,661,335 B1 | * | 12/2003 | Seal | 340/10.1 |
| 6,812,842 B2 | * | 11/2004 | Dimmer | 340/572.4 |
| 2003/0142073 A1 | * | 7/2003 | Fukushima et al. | 345/158 |

* cited by examiner

Primary Examiner—Edward Lefkowitz
Assistant Examiner—Hoai-An D. Nguyen
(74) Attorney, Agent, or Firm—John Wooldridge; Alan H. Thompson

(57) ABSTRACT

A non-contacting linear position location system employs a special transmission line to encode and transmit magnetic signals to a receiver on the object whose position is to be measured. The invention is useful as a non-contact linear locator of moving objects, e.g., to determine the location of a magnetic-levitation train for the operation of the linear-synchronous motor drive system.

24 Claims, 3 Drawing Sheets

US 6,906,528 B2

ELECTRONIC NON-CONTACTING LINEAR POSITION MEASURING SYSTEM

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to accurately determining the position of an object along a linear trajectory without making physical contact with the object, and more specifically, it relates to systems for determining the position of a magnetic levitation car relative to the track above which it moves.

2. Description of Related Art

There are numerous situations when it is required to use non-contacting means to measure the location along a linear track of a moving object. An example of such a situation is the problem of accurately locating the position and velocity of a magnetically levitated train car moving above a linear track. Accurate information on the location of the car in such cases would, for example, be needed in order to synchronize the drive currents of a Linear Synchronous Motor (LSM) drive with respect to the position of the train. In such drive systems the propulsion is obtained by exciting currents in multi-phased windings that are embedded in the track. These currents interact with the magnetic fields arising from an array of permanent magnets on the moving train car. In order to use the LSM drive system to accelerate the car, to keep it in motion at a constant speed, and then to decelerate it, the phase, amplitude and frequency of the currents in the LSM windings must be accurately controlled at all times. This requirement must be met by actively controlling the inverter that supplies the currents to the track. However to achieve this end it is necessary that the train car should be able to communicate its position, within an accuracy of a few millimeters, to the control circuits of the inverters. It is also required that the location method used should be insensitive to variations in the levitation height of the train car as might be caused, for example, by changes in the passenger loading.

SUMMARY OF THE INVENTION

It is an object of the present invention to provide a method and apparatus for determining the position of an object.

It is another object to provide a method and apparatus for determining the position of a magnetic levitation car relative to its track.

These and other objects will be apparent based on the disclosure herein.

The invention uses a helically twisted transmission line to generate positional information, and detects the positional information with an orthogonally nested pair of coils. The configuration is that of a "parallel-line" electrical transmission line that has been helically twisted with a pitch wavelength that is large compared to the spacing between the two conductors. To create the signals that are to be detected on the moving object, the transmission line is excited by an RF frequency. When the RF current flows in the transmission line there will exist in its near vicinity a time-varying magnetic field. This magnetic field will carry the necessary positional information.

Two small-area pickup coils will be located on the moving object. One coil has its axis pointing toward the symmetry axis of the transmission line to intercept the radial component of the magnetic field. The other coil has its axis oriented at 90 degrees to the first one, so that it intercepts the azimuthal component of the magnetic field.

A magnetic field varying at the RF frequency and having both azimuthal and radial components will be generated at the position of the pickup coils. The relative values of these two components at a particular instant of time are both sinusoidal in form and are equal in amplitude. However the fields will be shifted in spatial phase from each other by 90 degrees.

In one embodiment the signals detected by the pickup coils are full-wave rectified before being processed by the electronics. An alternative, which might be advantageous in some situations, would be to process the pickup loop voltages before rectification, in order to preserve faithfully all of the phase and amplitude information carried by these voltages.

Now, upon using electronic circuitry to take the ratio of these two signals, there will be produced periodic "spikes" with a spacing corresponding exactly to a half-wavelength of the helical line. These pulses represent fiducial marks that can be used to determine the position of the coils relative to the track.

In another embodiment, the position at any point between the fiducial marks is directly measured. The electronic system evaluates the phase angle as defined by the Arc Tangent of the ratio of the two fields to produce a series of triangular waves between the fiducial marks as the loops move with respect to the track The amplitude of these triangular waves at any phase position between their minimum and maximum value is linearly related to location between the marks, thus can be used to determine an accurate value of that location.

In yet another embodiment advantage is taken of the "reciprocal" nature of the transmission of radio frequency signals between a source and a receiver to induce RF voltages in the helical transmission line.

DETAILED DESCRIPTION OF THE INVENTION

Figure 1:
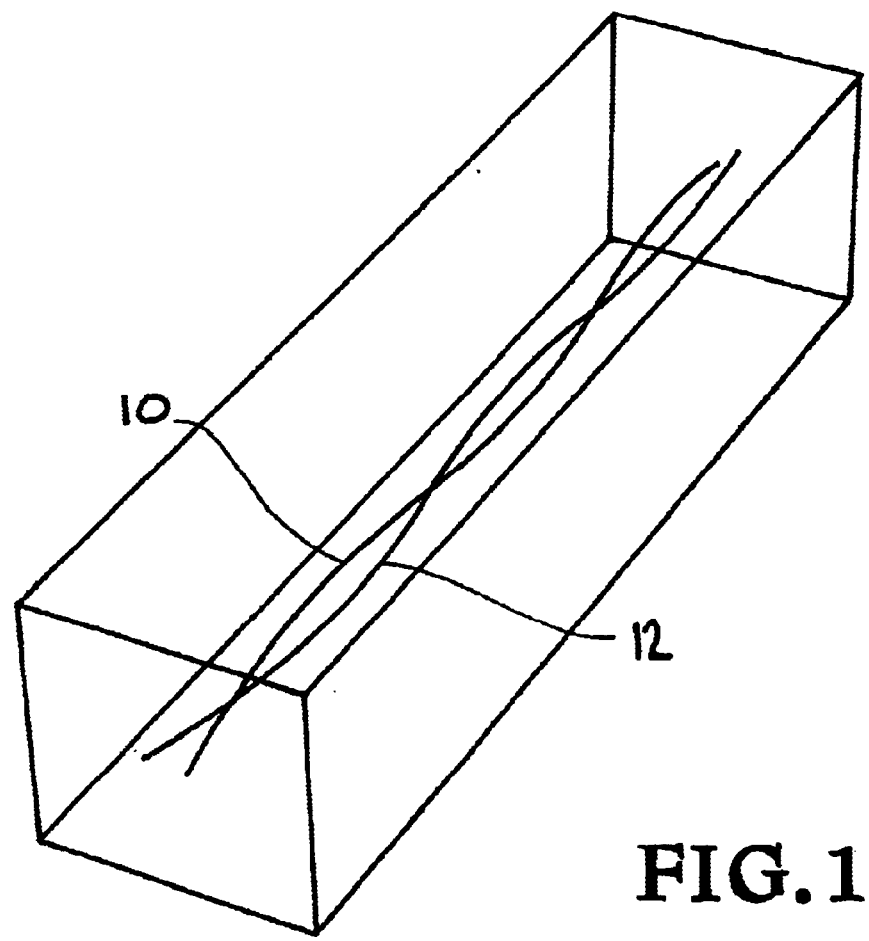
FIG. 1 is a schematic drawing of a helical parallel-wire transmission line.

The system described herein provides a method for solving the problems discussed above. It is based on the detection of magnetic fields generated by a special configuration of conductors that in effect, encodes the necessary positional information. A helically twisted line is shown schematically in FIG. 1. The configuration is that of a "parallel-line" electrical transmission line that has been helically twisted with a pitch wavelength that is large compared to the spacing between the two conductors 10 and 12. The pitch wavelength of the helical line, a constant along the line, is the characteristic "unit of distance." Fractional parts of this distance will be "reported", for example by a radio link to determine the instantaneous position of the moving object. To create the signals that are to be detected on the moving object, the transmission line is excited by an RF current at a low to intermediate RF frequency, for example 100 kHz. When these currents flow in the transmission line there will exist in its near vicinity (for example 5 cm away in a typical maglev-related situation) a time-varying magnetic field. As will be shown, this magnetic field will carry the necessary positional information. As represented in a cylindrical coordinate system with the mid-line of the helical twisted line as its axis, the magnetic field, oscillating at the RF frequency of its excitation, will have both radial and azimuthal components.

Figure 2:
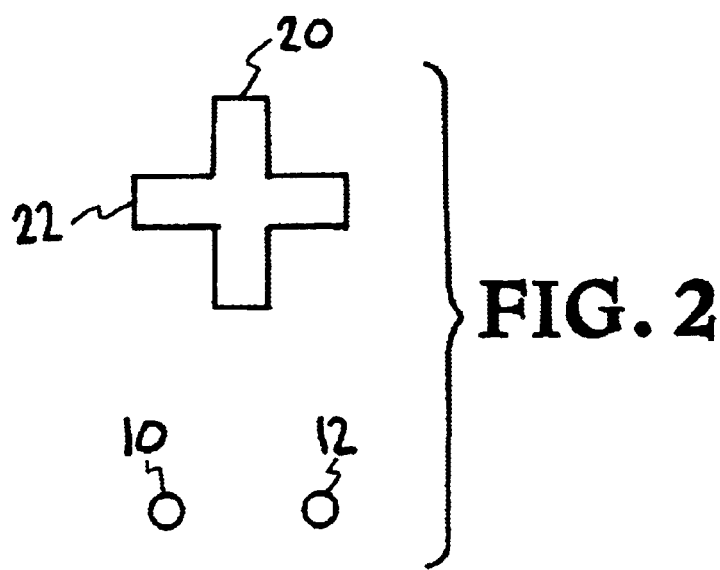
FIG. 2 shows two small-area pickup coils, nested together on the moving object.

As shown schematically in FIG. 2, on the moving object (not shown) there will be located two small-area pickup coils 20 and 22, nested together, each having the same area and the same number of turns of wire as the other one. One coil (20) has its axis pointing toward the symmetry axis of the transmission line (comprised of wires 10 and 12) and thus intercepts the radial component of the magnetic field. The other coil (22) has its axis oriented at 90 degrees to the first one, so that it intercepts the azimuthal component of the magnetic field from the helical transmission line.

Figure 3:
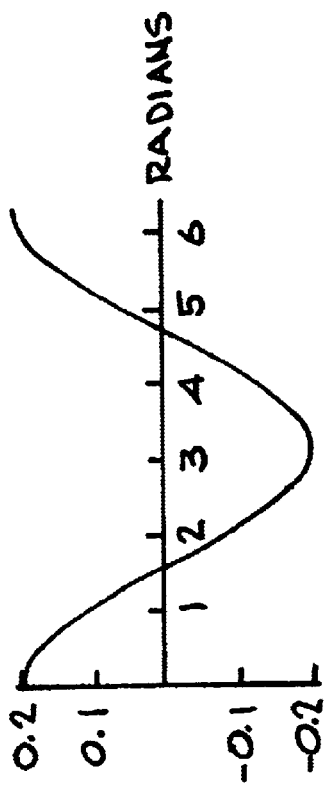
FIG. 3 shows variation (with spatial phase) of the radial component of the magnetic field.
Figure 4:
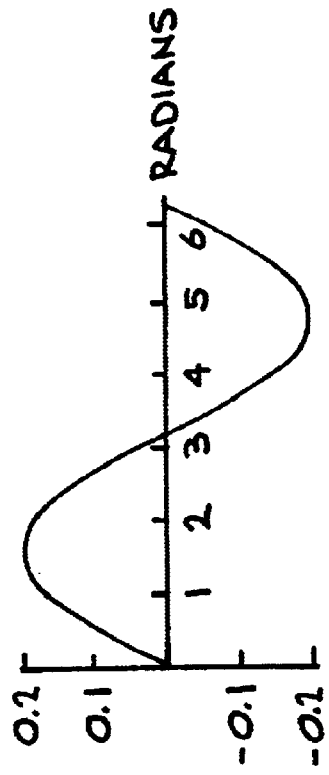
FIG. 4 shows variation (with spatial phase) of the azimuthal component of the magnetic field.

With the configuration as described above, the following will occur. A magnetic field varying at the RF frequency and having both azimuthal and radial components will be generated at the position of the pickup coils. FIGS. 3 and 4 are plots of the calculated relative value of these two components at a particular instant of time when the current is flowing in the positive direction in the right-hand conductor and in the negative direction in the left-hand conductor. As can be seen, the two components are both sinusoidal in form and are equal in amplitude. However the fields will be shifted in spatial phase from each other by 90 degrees.

In the description below, it will be assumed that the signals detected by the pickup coils are full-wave rectified before being processed by the electronics. An alternative, which might be advantageous in some situations, would be to process the pickup loop voltages before rectification, in order to preserve faithfully all of the phase and amplitude information carried by these voltages. This alternative approach will not be discussed here, in the interests of simplifying the discussion.

Figure 5:
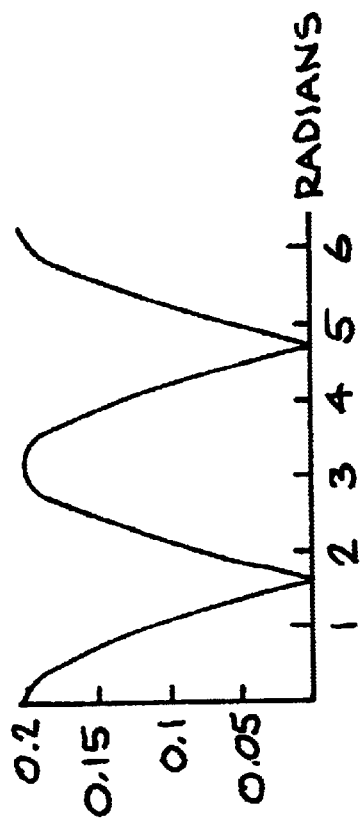
FIG. 5 shows the variation (with spatial phase) of the full-wave-rectified radial component of the magnetic field.
Figure 6:
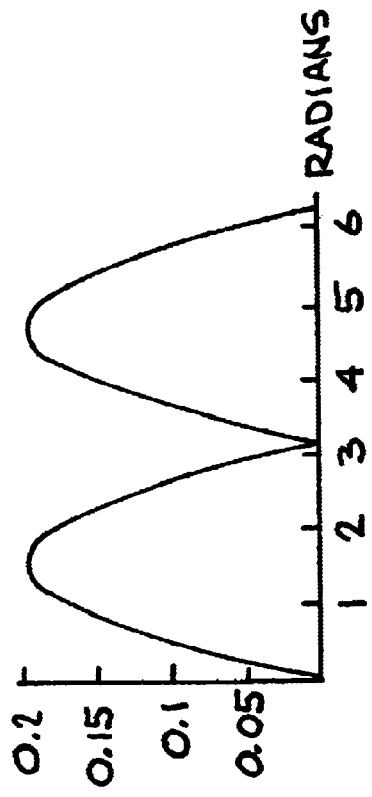
FIG. 6 shows the variation (with spatial phase) of the full-wave-rectified azimuthal component of the magnetic field.
Figure 7:
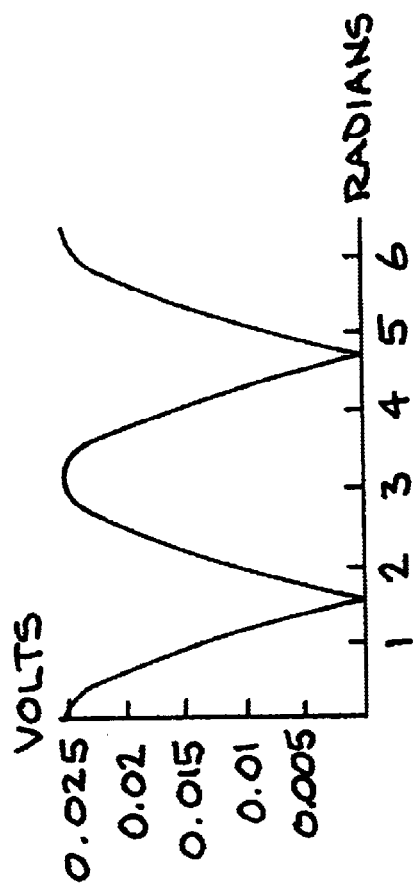
FIG. 7 is a plot of the ratio of a full-wave-rectified azimuthal signal to the radial signal vs the spatial phase.

Consider now the voltages induced in the two pickup loops by the RF magnetic fields as these loops move parallel to the direction of the axis of the transmission line. When these induced voltages are full-wave rectified the resulting signals will take the forms shown in FIGS. 5 and 6. Now, upon using electronic circuitry to take the ratio of these two signals, a signal of the type shown in FIG. 7 will result, i.e., there will be produced periodic "spikes" with a spacing corresponding exactly to a half-wavelength of the helical line. These pulses represent fiducial marks that can be used to determine the position of the coils relative to the track. Note that the location of these fiducial marks is independent of the amplitude of the signal, i.e., of the height of the detector coils above the transmission line (except that at too great a distance the signal intensity may be too low). To calculate the position of the object to which the nested coils are attached, a relative known starting position of the object is determined. For example, the object's starting position can be known, and as the object moves along the track, the method tabulates the sum of each "unit of distance" which is the total distance of the object from the starting point. The sum of each "unit of distance" can be made from many other points, as will be appreciated by those skilled in the art, e.g., from a gap in the transmission line, from a sudden change in the polarity of the transmission line or from a signal placed at points along the track to name a few.

Figure 8:
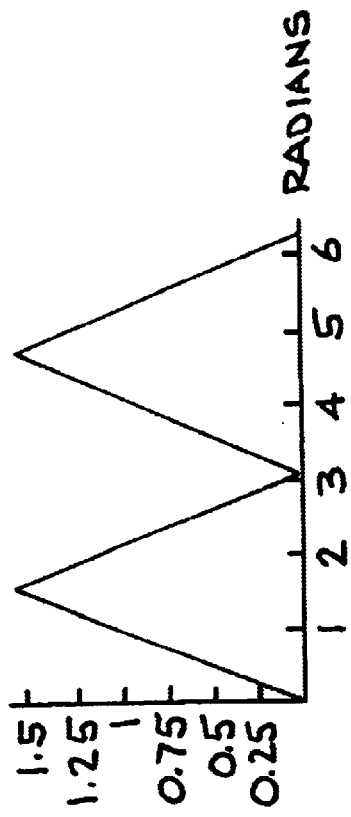
FIG. 8 is a plot of the ArcTan of the ratio of the full-wave rectified radial signal to the azimuthal signal vs the spatial phase.

While the above technique may be adequate for many situations, there are those situations where it is important to be able to directly measure the position at any point between the fiducial marks. This objective can also be accomplished by electronic processing of the detected and rectified signals. As shown in FIG. 8, if the electronic system evaluates the phase angle as defined by the Arc Tangent of the ratio of the two fields there will result a series of triangular waves between the fiducial marks as the loops move with respect to the track. The amplitude of these triangular waves at any phase position between their minimum and maximum value is linearly related to location between the marks, thus can be used to determine an accurate value of that location. The answer will be independent of the distance of the pickup coils above the helical line, as long as the signal is detectable.

Figure 10:
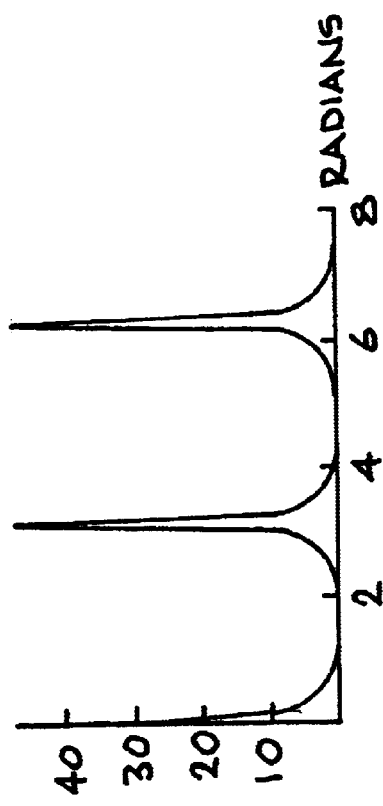
FIG. 10 is a plot (vs spatial phase) of calculated full-wave-rectified signal as received by the pickup loop intercepting the azimuthal field component.
Figure 9:
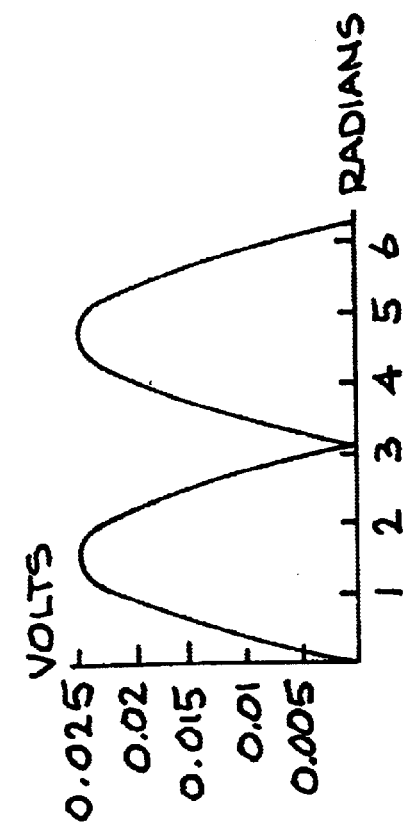
FIG. 9 is a plot (vs spatial phase) of the calculated full-wave-rectified signal as received by the pickup loop intercepting the radial field component

FIGS. 9 and 10 represent examples of the full-wave-rectified signals that would be received by orthogonal pickup loops, as calculated from the theory. For this example, the helical line was made up of two 2 mm diameter conductors, spaced apart by 10 mm. The line impedance was 635 ohms. It was assumed that the end of the transmission line was terminated in its characteristic impedance. The input end of the line was driven at a frequency of 100 kHz with a peak RF current of 1 ampere, requiring therefore 350 Watts of drive power. The orthogonal pickup loops were located at a distance of 50 mm from the centerline of the helical transmission line, had an area of 5 cm$^2$, and had 100 turns on each coil. As can be seen, the received signals are about 25 millivolts in amplitude, a signal level that would be entirely adequate for the purpose at hand. However, because of the strong cancellation of the fields that will occur at distances large compared to a pitch wavelength, the radiated RF power from the system at distances in excess of a meter or so should be extremely small.

The above two location techniques, because they depend only on the ratio of the induced voltages in the two pickup coils, permit the use of the same system for a non-interfering communication link between the track system and the moving vehicle. This communication can be effected by amplitude or frequency modulation of the exciting RF currents in the helical transmission line. This modulation will produce a signal on each pickup loop that could be detected on the moving vehicle by conventional means, without interference with the location-measuring function.

In yet another embodiment, advantage is taken of the "reciprocal" nature of the transmission of radio frequency signals between a source and a receiver. That is, the role of the helical transmission line and the orthogonal pickup loops is reversed, as follows: The two pickup loops are excited with radio-frequency currents that differ slightly from each other in frequency. These RF currents will then induce RF voltages in the helical transmission line the relative amplitude of which will be a function of the position of the pickup loops along the transmission line. Since the signals received will be at two different frequencies, it will be possible to electronically extract the necessary positional information, for example by using frequency-selective circuits followed by detection and amplitude-comparison circuits.

For those situations where it is important to make the position determination as independent as possible of both vertical and lateral displacements of the orthogonal pickup loops relative to the transmission line, two pairs of pickup loops could be employed. In this case the loop pairs would be displaced laterally, one to the left, and one to the right, of a vertical line passing through the geometric center of the helical line. If now the signals from the corresponding members of the loop pairs are combined electronically so as to average their output, the resultant positional determination will now be relatively insensitive to both vertical and horizontal displacements of the pickup loop assembly relative to the helical transmission line.

The present invention can thus be used to precisely determine the position of a movable or moving object on a track or relative to a point Examples of moving or movable objects include various types of magnetic levitation cars. Some examples of magnetic levitation systems are discussed in the following patent applications, which are incorporated herein by reference: U.S. patent application Ser. No. 09/896, 583, titled: "Improved Inductrack Magnet Configuration," and U.S. patent application Ser. No. 09/896,579, titled: "Improved Inductrack Configuration."

The foregoing description of the invention has been presented for purposes of illustration and description and is not intended to be exhaustive or to limit the invention to the precise form disclosed. Many modifications and variations are possible in light of the above teaching. For example, the transmission line may comprise more than two wires. In should be understood by those skilled in the art that the present invention can be implemented with a transmission line that produces a periodic field that is extracted to obtain periodic information. Each of the two coils of the nested coils may not have the same area and/or same number of turns because the difference could be compensated for electronically. More than two coils can be used in the nested coils, especially in cases where the transmission line utilizes more than two conductors, such that each coil is oriented to collect a signal from one of the conductors. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. An electronic non-contacting linear position measuring system, comprising:
   an electrical transmission line of at least two parallel conductors helically twisted with a pitch wavelength that is large compared to the spacing between said two parallel conductors, wherein said pitch wavelength is constant along said line and defines a characteristic unit of distance;
   a radio-frequency (RF) current source configured to provide RF current into said transmission line, wherein a time-varying magnetic field having both azimuthal and radial components will be induced in the vicinity of said transmission line;
   at least one nested coil comprising a first coil and a second coil orthogonally nested together, and attached to an object, wherein said first coil and said second coil have about the same area and the same number of turns of wire, wherein said first coil has its axis pointing toward the symmetry axis of said transmission line and thus will intercept said radial component to produce a corresponding radial signal, wherein said second coil has its axis oriented at 90 degrees to said first coil so that it will intercept said azimuthal component to produce a corresponding azimuthal signal; and
   means for calculating the instantaneous position of said object with respect to said transmission line based on said azimuthal signal and said radial signal.

2. The system of claim 1, wherein said means includes electronics and a full-wave rectifier to full-wave rectify said radial signal and said azimuthal signal before being processed by said electronics.

3. The system of claim 1, wherein said means includes electronic circuitry configured to take the ratio of said azimuthal signal and said radial signal.

4. The system of claim 1, wherein said means includes electronic circuitry configured to take the ratio of said azimuthal signal and said radial signal to produce periodic fiducial marks.

5. The system of claim 1, wherein said means includes electronic circuitry configured to take the ratio of said azimuthal signal and said radial signal to produce periodic fiducial marks with a spacing corresponding exactly to a half-wavelength of said transmission line, wherein said means are configured to use said fiducial marks to determine the position of said first coil and said second coil relative to said transmission line.

6. The system of claim 4, wherein said electronic circuitry is further configured to calculate the Arc Tangent of the ratio of said azimuthal signal and said radial signal to produce a series of triangular waves between said fiducial marks as said nested coil moves with respect to said transmission line, wherein the amplitude of said triangular waves at any phase position between their minimum and maximum value is linearly related to location between the marks such that the position at any point between said fiducial marks may be directly measured.

7. The system of claim 1, wherein said RF current source is configured to provide RF current into said transmission line by providing current directly into said first coil and said second coil, wherein RF voltages are induced in said transmission line.

8. The system of claim 7, wherein said RF current source is configured to provide a first current directly into said first coil and a second current directly into said second coil, wherein said first current and said second current differ slightly from each other in frequency, wherein these RF currents will then induce RF voltages in said transmission line the relative amplitude of which will be a function of the position of said nested coils along said transmission line.

9. The system of claim 8, wherein said means includes frequency-selective circuits followed by detection and amplitude-comparison to electronically extract the necessary positional information.

10. The system of claim 1, further comprising a radio link and a receiver, when said radio link is operatively connected and positioned to report fractional parts of said unit of distance and sums thereof to said receiver.

11. The system of claim 1, wherein said nested coil is operatively attached to a magnetic levitation car, wherein said transmission line is operatively connected to a magnetic levitation track.

12. The system of claim 1, wherein to calculate the position of said object, a relative known starting position of said object must be known, wherein said relative known starting position is selected from the group consisting of a gap in said transmission line, a sudden change in the polarity of said transmission line and a signal placed at points along said transmission line.

13. A method for measuring the position of a moving object along a track comprising:

provided an electrical transmission line of two parallel conductors helically twisted with a pitch wavelength that is large compared to the spacing between said two parallel conductors, wherein said pitch wavelength is constant along said line and defines a characteristic unit of distance;

inputting RF current into said transmission line, wherein a time-varying magnetic field having both azimuthal and radial components will be induced in the vicinity of said transmission line;

providing a nested coil comprising a first coil and a second coil orthogonally nested together, and attached to an object, wherein said first coil and said second coil have about the same area and the same number of turns of wire, wherein said first coil has its axis pointing toward the symmetry axis of said transmission line and thus will in said radial component to produce a corresponding radial signal, wherein said second coil has its axis oriented at 90 degrees to said first coil so that it will intercept said azimuthal component to produce a corresponding azimuthal signal; and calculating the instantaneous position of said object with respect to said transmission line based on said azimuthal signal and said radial signal.

14. The method of claim 13, wherein the step of calculating the instantaneous position of said object is carried out with electronics and a full-wave rectifier to full-wave rectify said radial signal and said azimuthal signal before being processed by said electronics.

15. The method of claim 13, wherein the step of calculating the instantaneous position of said object is carried out with electronic circuitry configured to take the ratio of said azimuthal signal and said radial signal.

16. The method of claim 13, wherein the step of calculating the instantaneous position of said object is carried out with electronic circuitry configured to take the ratio of said azimuthal signal and said radial signal to produce periodic fiducial marks.

17. The method of claim 13, wherein the step of calculating the instantaneous position of said object is carried out with electronic circuitry configured to take the ratio of said azimuthal signal and said radial signal to produce periodic fiducial marks with a spacing corresponding exactly to a half-wavelength of said transmission line, wherein said means are configured to use said fiducial marks to determine the position of said first coil and said second coil relative to said transmission line.

18. The method of claim 16, wherein said electronic circuitry is further configured to calculate the Arc Tangent of the ratio of said azimuthal signal and said radial signal to produce a series of triangular waves between said fiducial marks as said nested coil moves with respect to said transmission line, wherein the amplitude of said triangular waves at any phase position between their minimum and maximum value is linearly related to location between the marks such that the position at any point between said fiducial marks may be directly measured.

19. The method of claim 14, wherein the step of inputting RF current is carried out with an RF current source configured to provide RF current into said transmission line by providing current directly into said first coil and said second coil, wherein RF voltages are induced in said transmission line.

20. The method of claim 19, wherein said RF current source is configured to provide a first current directly into said first coil and a second current directly into said second coil, wherein said first current and said second current differ slightly from each other in frequency, wherein these RF currents will then induce RF voltages in said transmission line the relative amplitude of which will be a function of the position of said nested coils along said transmission line.

21. The method of claim 20, wherein the step of calculating the instantaneous position of said object is carried out with frequency-selective circuits followed by detection and amplitude-comparison to electronically extract the necessary positional information.

22. The method of claim 13, further comprising providing a radio link and a receiver, wherein said radio link is operatively connected and positioned to report fractional parts of said unit of distance and sums thereof to said receiver.

23. The method of claim 13, wherein said nested coil is operatively attached to a magnetic levitation car, wherein said transmission line is operatively connected to a magnetic levitation track.

24. The method of claim 13, wherein to calculate the position of said object, a relative known starting position of said object must be known, wherein said relative known starting position is selected from the group consisting of a gap in said transmission line, a sudden change in the polarity of said transmission line and a signal placed at points along said transmission line.

* * * * *